Patented Nov. 20, 1934

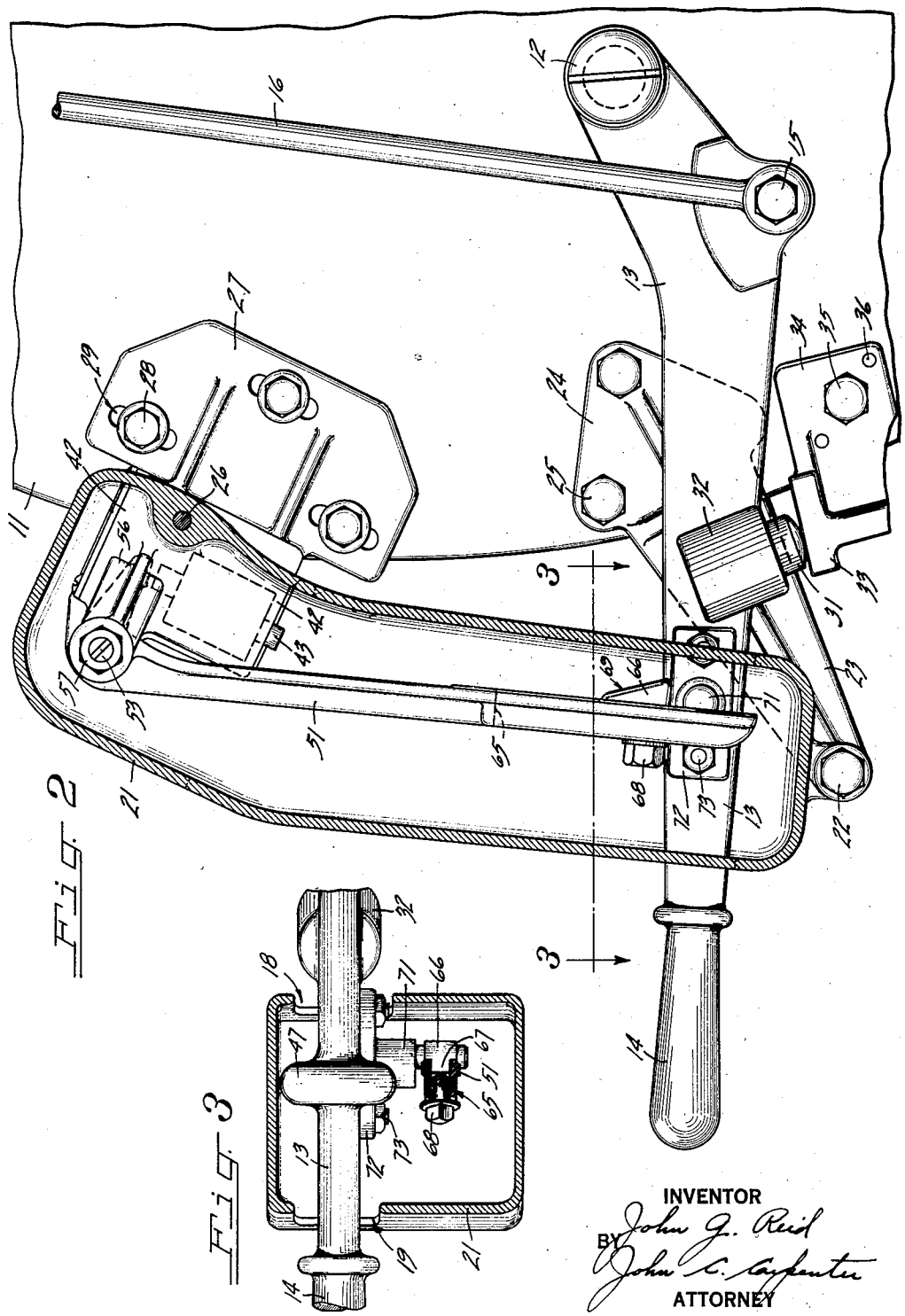

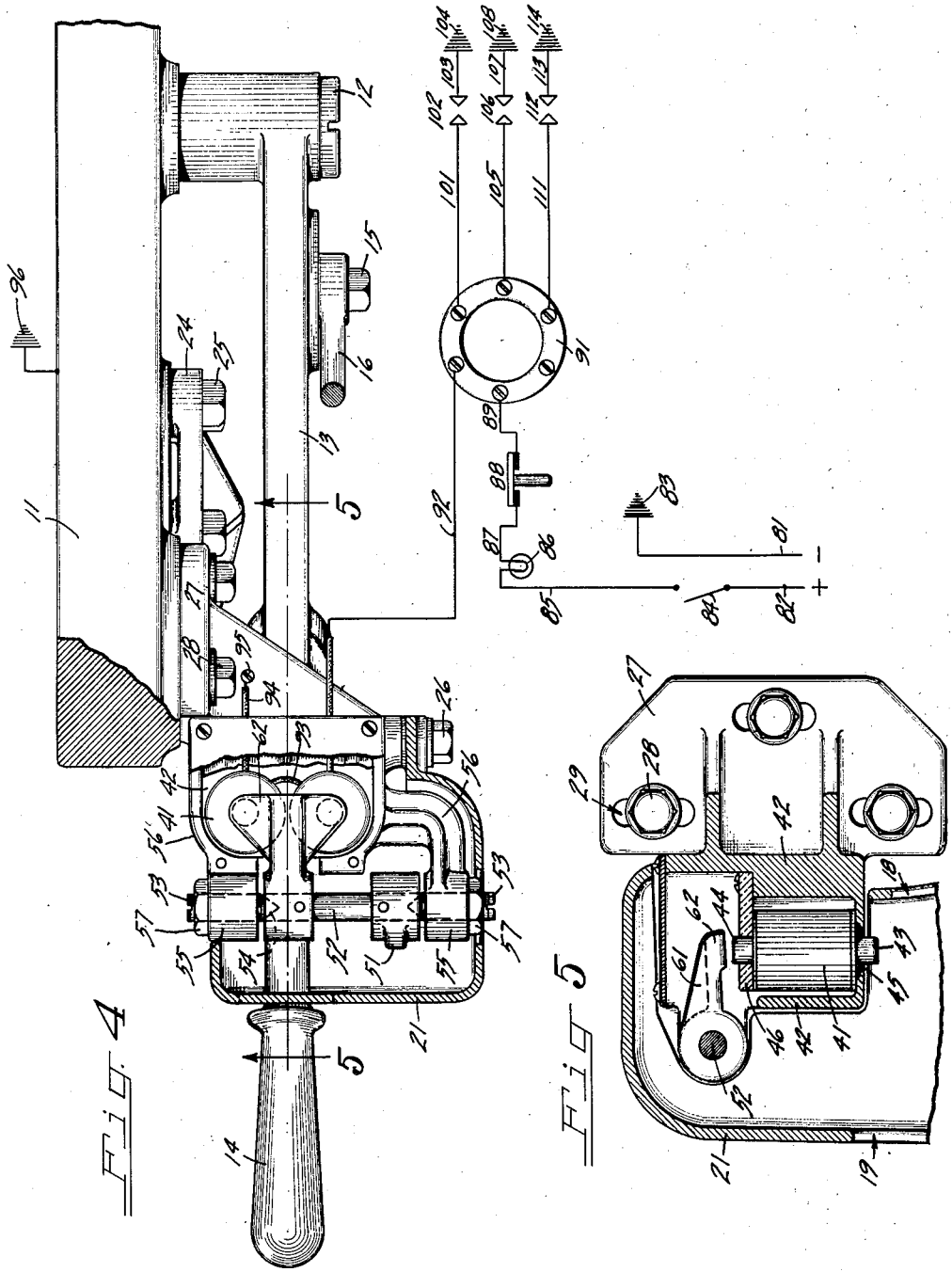

1,981,002

UNITED STATES PATENT OFFICE 1,981,002

ELECTRICAL CONTROL SYSTEM

John G. Reid, San Jose, Calif., assignor to American Can Company, New York, N. Y., a corporation of New Jersey Application June 12, 1931, Serial No. 543,828

7 Claims. (Cl. 192—129)

The present invention relates to an operating control for can machinery and the like and has particular reference to an electrically operated safety device used in connection with automatic stop devices and a starting and stopping machine element.

The principal object of the present invention is the provision of an electrical, fully automatic control adapted for use in connection with an operating part of a can making machine for insuring normal operating conditions in the machine by stopping the machine if abnormal conditions arise and by preventing starting until the abnormalities are completely removed.

An important object of the invention is the provision of an electrical safety switch associated with the starting and stopping lever of a can machine and electrically influenced by any abnormal conditions which might arise in the machine and when so influenced automatically preventing any machine operation.

Numerous other objects of the invention will be apparent as it is better understood from the following description, which, taken in connection with the accompanying drawings, discloses a preferred embodiment thereof.

Referring to the drawings:—

Fig. 2 is a view similar to Fig. 1 illustrating the parts in stopping position;

Fig. 3 is a sectional plan view taken substantially along the line 3—3 in Fig. 2;

Fig. 4 is a sectional plan view taken substantially along the broken line 4—4 in Fig. 1 and in addition illustrating in diagram the electrical wiring used in the electrical control; and Fig. 5 is a transverse sectional detail taken substantially along the line 5—5 in Fig. 4.

Figure 1:
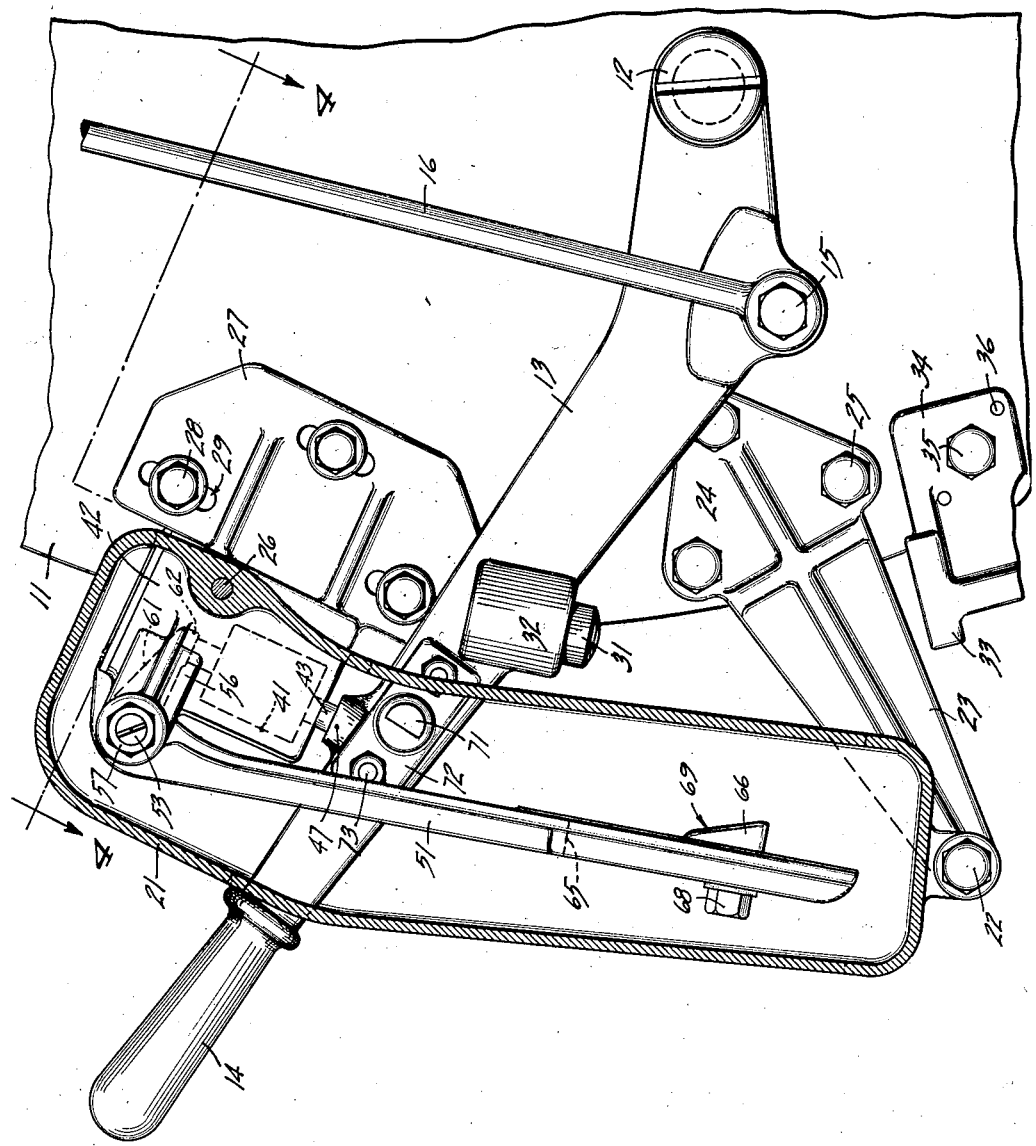
Figure 1 is a schematic view partly in section illustrating a hand starting and stopping lever of a can making machine together with mechanism of an electrical control for the hand lever, the view illustrating the parts in starting position.

In the operation of high speed can making machinery or the like, it has been found highly desirable to equip the machine or machines with stop devices for preventing abnormal accumulation of the work being operated on in the machine and for stopping the machine in the event of an abnormal condition arising. For this purpose both mechanical and electrical stop devices have been used which actuate, in different ways, some stopping control element associated with the machine. Modern high speed apparatus, in which several operations are performed in the same machine, requires a plurality of such stopping devices arranged at different positions. After a machine is thus automatically stopped it is preferably manually started by means of a hand controlled lever or similar active element.

While an operator is supposed to completely remove the abnormal condition before again starting the machine carelessness or an improper understanding of such abnormality sometimes results in a starting of the machine before all of the abnormal conditions have been removed. This throws a great deal of strain upon the machine parts and in many instances causes damage to the machine, even though it is again automatically stopped by the control devices. It also frequently happens that more than one control device is actuated by different abnormal conditions and that all such conditions are not cleared before attempting to start the machine which as before result in damage to the machine.

The present invention contemplates the addition of a safety element to electrically controlled apparatus which automatically operates when an abnormal condition prevails and which locks the hand control lever in its stopping position, preventing starting of the machine until all of the abnormal conditions have been corrected. By reason of such a safety element all of the electrical stop devices must be cleared before the machine can be brought in operating condition and accordingly when a machine can be started it will be with full assurance that only normal conditions prevail throughout.

For the purpose of graphically illustrating the invention, sufficient of the mechanism associated with a metal forming press is selected, the association of the electrical control and safety system being shown in their proper connection with a manually operated starting and stopping element of the machine. A plurality of electrical stop devices are diagrammatically indicated in the drawings, the operation of such devices having a distinct bearing on the improved safety control of the present invention although their mechanical details are immaterial.

A part of a press which may be a frame, is indicated in the drawings by the numeral 11 (Figs. 1 and 2) and such a part forms a support for a stud 12 threadedly engaged therewith and providing a pivot for a control lever 13 having a handle 14 for manual operation. The lever 13 is pivotally connected at 15 to one end of an actuating rod 16 which connects to an operating part of the press such as a clutch or its equivalent in the regular and well known manner.

The hand lever 13 is adapted to rest in one of two positions, the upper position (Fig. 1) being the starting position effecting operation of the machine, while the lower position (Fig. 2) is the stopping position wherein the machine is not operating.

The lever 13 has movement through slots 18, 19 (Figs. 3 and 5) formed in a housing 21 connected by a bolt 22 to an extension 23 of a bracket 24 secured by bolts 25 to the frame 11 and enclosing a lever-locking means. The upper end of the casing 21 is connected by a bolt 26 to a bracket 27 which is secured by bolts 28 to the frame 11. This bracket 27 is slotted at 29 to permit its adjustment relative to the frame of the machine for a purpose hereinafter described.

The housing 21 prevents any release of the lever-locking means excepting when such release is effected by the closing of shunt circuits hereinafter described.

The hand lever 13 by reason of its weight normally rests in lowered position, this being the stopping position and in such lowered position a spring pressed button 31 (Fig. 2) having sliding movement within a boss 32 formed on the side of the lever 13 rests against a stop plate 33 formed in a bracket 34 secured to the frame by a bolt 35 and by pins 36.

Provision is made for holding the lever 13 in its raised or machine operating position. For this purpose, a double electro-magnet 41 (Figs. 1, 4 and 5) is mounted in a housing 42 formed as an integral part of the bracket 27, the electro-magnet having extending core poles 43, 44 on opposite sides of its ends and being held within and insulated from the housing 42 by a washer 45 and an insulated plate 46 secured to the housing 42. The double extending cores 43 are adapted to engage with an enlargement or double boss 47 formed in the hand lever 13, such engagement magnetically holding the handle in its raised and operating position (Fig. 1) as long as the electro magnet 41 is energized.

The opposite double core ends of the electro-magnet are adapted to cooperate with a hand lever locking device which has two positions, one locking the hand lever 13 in its stopping position, the other position permitting free manual lifting of the lever into its starting position. This locking device comprises an arm 51 (Figs. 1, 2 and 4) which is located inside of the housing 21 and is pinned at its upper end to a rock-shaft 52 mounted for oscillation between pivot center screws 53 having conical ends 54 which rest within cupped depressions in the ends of the shaft 52. Each screw 53 is threadedly engaged in a bearing 55 formed in arm extensions 56 of the housing 42 and is held in adjusted position by a locknut 57.

This construction provides an adjustable substantially frictionless pivotal mounting for the shaft 52 and insures free movement of the arm 51.

A relatively short arm 61 is also pinned to the shaft 52 and its outer extremity is spread or enlarged at 62 to cover both poles 44 of the double electro-magnet 41. When the magnet is energized the arm 61 is drawn over and held in contact with the poles 44 thereof (Fig. 1), this action oscillating the shaft 52 and shifting the arm 51 into unlocked position. The active locking feature of the arm 51 is embodied in its lower end. This arm is longitudinally slotted at 65 (Figs. 1 and 3) and a block 66 formed with an extension 67 has sliding movement, for adjustment purposes, along the front of the arm and partially within the slot 65. It is securely clamped in its adjusted position by a bolt 68 which extends through the slot from the opposite side of the arm this bolt having threaded engagement in the block with its head engaging the rear of the arm. This block acts as a stop or lock for the lever with the arm 51 in its locked position.

Since the magnet 41 is carried in the bracket 27 it may be adjusted within the housing 21 by adjustment of the bracket relative to the press frame 11, the slots 29 permitting this action. This adjustment also applies to the arms 51, 61 mounted indirectly on the bracket 27. In this way the entire safety device is properly positioned relative to the lever 13.

When the magnet 41 is deenergized the weight of the arm 51 is sufficient to swing it, the shaft 52 and the arm 61 into the position illustrated in Fig. 2, this being the locking position. Immediately upon deenergizing of the magnet and while the arm 51 is swinging into place, the lever 13 being released from the magnet's holding influence is also moving into its stopping position.

An inclined surface 69 formed on the front face of the block 66 permits downward movement of a stop pin 71, with the moving lever 13, the former being formed as an integral part of a plate 72 which is secured to one side of the lever by bolts 73. As illustrated in Fig. 2, when the arm 51 is in locking position, it rests against the stop pin 71 which at such time is directly beneath the block 66. This block forms an obstruction against upward movement of the lever 13 which cannot be lifted as long as the block is in the path of the pin 71.

Electrical current is normally flowing through the electro-magnet holding the lever lock device 51 in unlocked position and the operating hand lever 13 in starting position. The electrical circuit for this current is indicated in wiring diagram in Fig. 4 and comprises lead wires 81, 82 connected with any suitable source of electrical energy. The wire 81 is indicated as being grounded at 83, such a ground in the present instance being the frame of the machine.

The wire 82 is preferably connected to one end of a switch 84 which when closed connects it with a wire 85 leading into a resistance lamp 86 and thence by wire 87 into a momentary release switch 88 which when closed, connects with a wire 89 secured to a contact ring 91. A wire 92 leads from the contact ring into one side of the windings of the electro-magnet 41, a connecting wire 93 being used to connect the two coils thereof. A wire 94 leads from the opposite end of the magnet windings and is connected at 95 to the frame of the machine. This frame is indicated as being grounded at 96 and the current is completed by connection with the ground 83 of the wire 81. Electrical current flowing through this circuit maintains the magnet 41 energized and constitutes the primary or magnet circuit.

Any suitable types of electrical stop devices may be utilized with the machine, certain contacting points of each stop device being located at desirable places throughout the machine and being affected by adverse operating conditions in the usual and preferred manner. Any number of these electrical stop devices may be provided, three being indicated in the wiring diagram of Fig. 4.

The first of the three electrical stop devices is embodied in a circuit comprising a wire 101 connected with the contact ring 91 and leading to one side of contactor elements 102 which are connected on their opposite side by a wire 103 to ground at 104. In a similar manner a second stop device may comprise a wire 105 connected to the contact ring 91 and leading to contactor points 106 and a wire 107 to a ground 108. A third electrical stop device may comprise a wire 111 also connected to the contact ring 91 and leading to contact points 112 attached at one side to a wire 113 which is grounded at 114.

Normally, the circuits through the respective contactor stop devices are open with no flow of electrical energy through the wires embodied in the same. In the event of an abnormal condition occurring at one or more of the contact points 102, 106, 112, the circuit connected therewith is closed and a shunt circuit is formed.

For example, as the contactor points 102 closed by an abnormal condition occurring in the machine adjacent these contactor points, electrical energy will flow through the wire 82, switch 84, wire 85, lamp 86, wire 87, switch 88, wire 89, contact ring 91, wire 101, contact points 102, wire 103, ground 104 to ground 83 and back to wire 81. Such a shunt circuit, not having the high resistance offered by the windings in the electromagnet 41, offers the shortest path for the flow of electrical energy and this diverts the electrical energy from the magnet circuit. The electro-magnet 41 is thereupon deenergized and the lever 113 drops into its stopping position cutting off operation of the machine. The lever locking device 51, at the same time, falls into its locking position behind and above the lever. The machine can not again be started until the electro-magnet 41 is energized and this can not take place until the shunt circuit through the contact points 102 is broken.

In a similar way a shunt circuit may be established through the second contactor points 106 the current at such time flowing in the same manner to the contact ring 91 thence through wire 105, contact points 106, wire 107 and ground 108 to the ground 83 and back to the wire 81 again deenergizing the magnet 41 and stopping the machine. In the event of closing of a shunt circuit through the contact points 112 the current will again flow to the contact ring 91 and thence through the wire 111, contact points 112, wire 113, ground 114, the ground 83 and back to the wire 81 with the same results as before.

It sometimes happens that different abnormal conditions occur at the same time but at different positions in the machine and in such cases two or more shunt circuits may be simultaneously established. Removing the difficulty at one place will not place the machine in working condition and it will be evident, in referring to the wiring diagram of Fig. 4, that the magnet 41 can not be energized until all of the electrical stop devices have been cleared and all of the shunt circuits connected therewith have been terminated and brought into open positions.

This insures that before a single operating stroke of the machine can take place and before the operator can move the lever 13 into starting position, it is necessary that all settings on the machine and all parts thereof are in normal operating position. Thus, in a simple manner, full provision is made against damage to any part of the machine or to the work being handled thereby.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In an electrical control for can making machines, the combination of an electric circuit and stop device therein operable upon the occurrence of an abnormal condition in the machine to automatically stop its operation, means for starting the operation of the machine and locking means released by the remaking of the electric circuit of said electric stop device for preventing the operation of the said starting means and resumption of operation of the machine until the abnormal condition is removed.

2. In an electrical control for can making machines, the combination of a plurality of electric circuits and stop devices therein each operable upon the occurrence of an abnormal condition in the machine to automatically stop its operation, means for starting the operation of the machine and locking means released by the remaking of the electric circuits of all of said electric stop devices for preventing the operation of the said starting means and resumption of operation of the machine until all of the abnormal conditions are removed.

3. In an electrical control for can making machines, the combination of a starting and stopping lever, electrical means for holding said lever in starting position to effect operation of the machine, said lever otherwise moving to stopping position, electrical stop devices operable upon the occurrence of abnormal conditions in the machine to automatically release said lever and stop operation of said machine, and means associated with said electrical holding means for holding said lever in machine stopping position until said electrical stop devices are cleared.

4. In an electrical control for can making machines, the combination of a starting and stopping lever, an electro-magnet for holding said lever, when energized, in starting position to effect operation of the machine, said lever when not held moving to stopping position, electrical stop devices operable upon the occurrence of abnormal conditions in the machine to deenergize said magnet and release said lever and stop operation of said machine, locking means for said lever released by said magnet when energized, and electrical means associated with said stop devices for preventing energizing of said magnet until all of said electrical stop devices are cleared.

5. In an electrical control for can making machines, the combination of a starting and stopping lever, an electro-magnet for holding said lever, when energized, in starting position to effect operation of the machine, said lever moving to stopping position when not held by said magnet, electrical stop devices operable upon the occurence of abnormal conditions in the machine to deenergize said magnet and release said lever and stop operation of said machine, electrical means associated with said stop devices for preventing energizing of said magnet until all of said electrical stop devices are cleared, and means associated with said magnet for holding the lever in stopping position and preventing movement of said lever into starting position until said magnet is energized.

6. In an electrical control for can making machines, the combination of a lever having a starting and a stopping position and adapted when in starting position to effect operation of the machine, a lever lock device movable into one of two positions and adapted when in one position to lock said lever in its stopping position and when in the other position to release said lever, a double ended electro-magnet for holding, when energized, said lock device in unlocked position and said lever in starting position, and electrical stop devices operating upon occurrence of abnormal conditions in the machine to deenergize said electro-magnet and release the lever and permit said lock device to lock said lever in its stopping position.

7. In an electrical control for can making machines, the combination of a starting and stopping lever, an electro-magnet for holding said lever, when energized, in starting position to effect operation of the machine, said magnet being connected with a normally closed electrical circuit for energizing it, electrical stop devices each connected in a normally open electrical shunt circuit connected with said shunt circuit and operating upon occurrence of abnormal conditions in the machine to automatically close a said shunt circuit and deenergize said closed circuit and electro-magnet thereby releasing said lever from its starting position to move to its stopping position and stopping operation of said machine, and means for preventing restoration of said lever into starting position until all of said shunt circuits are open and the abnormal conditions relieved.

JOHN G. REID.